United States Patent [19]
Nakajo et al.

[11] Patent Number: 5,208,302
[45] Date of Patent: May 4, 1993

[54] CATALYST, PROCESS FOR PREPARATION OF SAME AND PROCESS FOR POLYMERIZATION OF OLEFINS USING SAME

[75] Inventors: Tetuo Nakajo; Hisayoshi Yanagihara; Masaki Fushimi; Shigenobu Miyake, all of Oita; Hideki Sakurai, Sendai, all of Japan

[73] Assignee: Showa Denko K.K., Tokyo, Japan

[21] Appl. No.: 717,141

[22] Filed: Jun. 18, 1991

Related U.S. Application Data

[62] Division of Ser. No. 551,238, Jul. 11, 1990, Pat. No. 5,049,533.

[30] Foreign Application Priority Data

Jul. 11, 1989 [JP] Japan .................. 1-178620

[51] Int. Cl.$^5$ .................. C08F 4/651; C08F 10/00
[52] U.S. Cl. ..................... 526/125; 526/351
[58] Field of Search ........................ 526/125

[56] References Cited

FOREIGN PATENT DOCUMENTS 45977 2/1982 European Pat. Off. ............ 526/128

*Primary Examiner*—Edward J. Smith
*Attorney, Agent, or Firm*—Sughrue, Mion, Zinn, Macpeak & Seas

[57] ABSTRACT

Disclosed is a catalyst composition for use in the polymerization of olefins, which is comprised of (a) a catalyst component containing magnesium, titanium, a halogen, and an ingredient derived from a keto-ester compound, and (b) an organic aluminum compound. The catalyst activity and capability of providing a highly stereoregular polymer are enhanced by preparing the catalyst component (a) by a process wherein, during or after the formation of a solid catalyst component containing magnesium, titanium, and a halogen, the solid catalyst component is treated with a keto-ester of the formula:

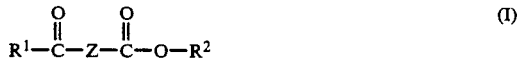

wherein $R^1$, $R^2$ and Z represent a hydrocarbon group.

5 Claims, No Drawings

CATALYST, PROCESS FOR PREPARATION OF SAME AND PROCESS FOR POLYMERIZATION OF OLEFINS USING SAME

This is a divisional of application No. 07/551,238 filed Jul. 11, 1990, now U.S. Pat. No. 5,049,533.

BACKGROUND OF THE INVENTION

1. Field of the Invention

This invention relates to a catalyst composition showing a high activity for homopolymerizing or copolymerizing olefins. More particularly, it relates to a catalyst composition and a process for the preparation thereof which catalyst composition provides a highly stereoregular polymer in a high yield when the catalyst composition is used for the polymerization of an α-olefin having at least 3 carbon atoms, and a process for the polymerization of olefins.

2. Description of the Related Art

Many proposals have been made on the process for the preparation of a catalyst component where a solid catalyst component comprising magnesium, titanium and halogen compounds and an electron donor, (i.e., an internal donor) as indispensable ingredients. In most of these proposals, an organic carboxylic acid ester is used as the electron donor, and there is a problem in that an ester smell remains in the formed polymer unless the ester is removed by washing with an organic solvent or the like means. Moreover, these catalyst components have a poor catalytic activity and provide a low stereo-specificity. Accordingly, the development of a catalyst having a higher performance is desired.

SUMMARY OF THE INVENTION

A primary object of the present invention to provide a catalyst system having a high catalytic activity and capable of providing a highly stereoregular olefin polymer, which is difficult to obtain by the conventional technique.

In accordance with the present invention, there is provided a process for the preparation of a catalyst component for use in the polymerization of olefins, which comprises, during or after the formation of solid catalyst component derived from a magnesium compound, a titanium compound and a halogen-containing compound as indispensable ingredients, treating the solid catalyst component with at least one member selected from the group consisting of keto-ester compounds represented by the following general formula (I):

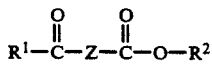

wherein $R^1$ and $R^2$ independently represent a univalent hydrocarbon group having 1 to 20 carbon atoms which may have at least one halogen substituent, and Z represents a divalent hydrocarbon group having 1 to 30 carbon atoms which may have at least one halogen substituent, the $R^1$, $R^2$, and Z being selected from the group consisting of aliphatic hydrocarbon groups, alicyclic hydrocarbon groups, aromatic hydrocarbon groups, polycyclic hydrocarbon groups.

DESCRIPTION OF THE PREFERRED EMBODIMENTS

As the magnesium compound used for the preparation of the solid catalyst component in the present invention, there can be mentioned magnesium halides such as magnesium chloride and magnesium bromide, magnesium alkoxides such as magnesium ethoxide and magnesium isopropoxide, magnesium salts of carboxylic acids such as magnesium laurate and magnesium stearate, alkyl magnesium such as butylethyl magnesium, alkyl magnesium halides such as n-butyl magnesium chloride, and alkylalkoxy magnesium compounds such as n-butylethoxy magnesium. These magnesium compounds can be used alone or as a mixture of two or more thereof. A magnesium halide or a compound capable of forming a magnesium halide at the step of preparing the catalyst is preferably used. The compound having chlorine as the halogen is most preferably used.

As the titanium compound used for the preparation of the solid catalyst component in the present invention, there can be mentioned titanium halides such as titanium tetrachloride, titanium trichloride, and titanium tetrabromide, titanium alkoxides such as titanium butoxide and titanium ethoxide, and alkoxytitanium halides such as phenoxytitanium chloride. These titanium compounds can be used alone or as a mixture of two or more thereof. A tetravalent titanium compound containing a halogen is preferably used, and titanium tetrachloride is most preferably used.

As the halogen of the halogen-containing compound used for the preparation of the solid catalyst component in the present invention, there can be mentioned fluorine, chlorine, bromine and iodine, and chlorine is preferable. The kind of the halogen-containing compound practically used depends on the catalyst-preparing process, and as typical instances, there can be mentioned titanium halides such as titanium tetrachloride and titanium tetrabromide, silicon halides such as silicon tetrachloride and silicon tetrabromide, and phosphorus halides such as phosphorus trichloride and phosphorus pentachloride. In some preparation processes, halogenated hydrocarbons, halogen molecules and hydrohalogenic acids such as HCl, HBr and HI can be used.

The keto-ester compound used in the present invention is represented by the following general formula:

In the general formula (I), $R^1$ is a univalent hydrocarbon group having 1 to 20 carbon atoms, which is selected from the group consisting of aliphatic hydrocarbons, alicyclic hydrocarbons, aromatic hydrocarbons, and polycyclic hydrocarbons. As specific examples, there can be mentioned methyl, ethyl, n-propyl, i-propyl, sec-butyl, tert-butyl, tert-amyl, 2-hexenyl, isopropenyl, cyclopentyl, cyclohexyl, tetramethylcyclohexyl, cyclohexenyl, norbornyl, phenyl, tolyl, ethylphenyl, xylyl, cumyl, trimethylphenyl, tetramethylphenyl, pentamethylphenyl, naphthyl, methylnaphthyl, anthranyl, benzyl, diphenylmethyl, and indenyl groups. $R^1$ may have at least one halogen substituent. Among these groups, a univalent aromatic or polycyclic hydrocarbon group having 6 to 20 carbon atoms is preferably used.

In the general formula (I), Z is a divalent hydrocarbon group having 1 to 30 carbon atoms, which is selected from the group consisting of aliphatic hydrocarbons, alicyclic hydrocarbons, aromatic hydrocarbons, and polycyclic hydrocarbons. As specific examples, there can be mentioned methylene, ethylene, trimethylene, propylene, cyclohexane-diyl, tetramethylcyclohexane-diyl, o-phenylene, m-phenylene, p-phenylene, dimethyl-o-phenylene, 1,2-naphthylene, 2,3-naphthylene, 1,8-naphthylene, biphenylene, binaphthylene, and 1,9-fluorenediyl groups. Z may have at least one halogen substituent. Among these groups, a divalent aromatic or polycyclic hydrocarbon group having 6 to 20 carbon atoms is preferably used.

In the general formula (I), $R^2$ represents a univalent hydrocarbon group having 1 to 20 carbon atoms, which is selected from the group consisting of aliphatic hydrocarbons, alicyclic hydrocarbons, aromatic hydrocarbons, and polycyclic hydrocarbons. As specific examples, there can be mentioned methyl, ethyl, n-propyl, isopropyl, n-butyl, isobutyl sec-butyl, tert-butyl, pentyl, hexyl, heptyl, octyl, 2-ethylhexyl, cyclohexyl, phenyl tolyl, xylyl, and naphthyl groups. $R^2$ may have at least one halogen substituent. A univalent aliphatic hydrocarbon group having 1 to 12 carbon atoms is preferably used.

As specific examples of the keto-ester compound represented by the general formula (I), there can be mentioned methyl 2-benzoylbenzoate, ethyl 2-benzoylbenzoate, n-butyl 2-(2'-methylbenzoyl)benzoate, ethyl 2-(2',4'-dimethylbenzoyl)benzoate, ethyl 2-(2',4',6'-trimethylbenzoyl)benzoate, propyl 2-(pentamethylbenzoyl)benzoate, ethyl 2-(triethylbenzoyl)benzoate, ethyl 2-(4'-chlorobenzoyl)benzoate, methyl 2-(trimethylbenzoyl)-4,5-dimethylbenzoate, n-propyl 2-(benzoyl-3,6-dimethylbenzoate, ethyl (1'-naphthyl)phenylketone-2-carboxylate, methyl (1'-naphthyl)-4,5-dimethylphenylketone-2-carboxylate, propyl (2'-naphthyl)-phenylketone-2-carboxylate, butyl phenyl-1-naphthylketone-2-carboxylate, ethyl mesityl-2-naphthylketone-3-carboxylate, propyl 8-benzoylnaphthalene-carboxylate, heptyl 8-toluoylnaphthalene-carboxylate, isobutyl 2'-toluoylbiphenyl-2-carboxylate, methyl 2'-benzoylbiphenyl-2-carboxylate, ethyl 2'-benzoylbinaphthyl-2-carboxylate, butyl (5'-indenyl)phenylketone-2-carboxylate, n-butyl 2-benzoylfluorene-carboxylate, ethyl 9-benzoylfluorenecarboxylate, n-butyl 6-(4'-toluoyl)-indene-5-carboxylate, and ethyl 10-benzoylphenanethrene-10-carboxylate.

The process for the preparation of the catalyst used in the present invention is not particularly critical. A method can be adopted in which a magnesium compound such as a magnesium halide, a titanium compound such as a titanium halide and the keto-ester of formula (I) are co-pulverized and the halogenation treatment is then carried out to increase the activity. Alternatively, a method can be adopted in which the magnesium compound is pulverized alone or in combination with a silicon compound or phosphorus compound and the titanium compound treatment and the halogenation treatment are carried out in the presence of the keto-ester of formula (I).

Moreover, a method can be adopted in which a magnesium carboxylate or magnesium alkoxide, the titanium compound, the halogenating agent and the keto-ester of formula (I) are heat-treated to enhance the performances, or a method in which a magnesium halide is dissolved in an organic solvent and the keto-ester of formula (I) is reacted in the presence of the titanium compound during or after the precipitation.

Still further, a catalyst formed by adding the keto-ester of formula (I) and titanium compound when the alkyl magnesium is reacted with the halogenating agent can be used.

Still in addition, a catalyst formed by adding the keto-ester of formula (I) and titanium compound when the halogenated hydrocarbon is reacted with metallic magnesium to form a magnesium halide is the starting material; can be used.

The amount of the keto-ester of formula (I) left in the catalyst differs according to the preparation process, but the titanium/magnesium/keto-ester molar ratio is preferably in the range of $1/(1 \text{ to } 1,000)/(10^{-6} \text{ to } 100)$, more preferably $1/(2 \text{ to } 100)/(10^{-4} \text{ to } 10)$. If the amount of the keto-ester of formula (I) is too small and below the above-mentioned range, the stereospecificity of the olefin polymer is reduced, but if the amount of the keto-ester of formula (I) is too large, the catalytic activity is reduced.

The polymerization of olefins will now be described.

An olefin can be polymerized by using the thus obtained solid catalyst component of the present invention in combination with an organic aluminum compound.

As typical examples of the organic aluminum compound used in the present invention, there can be mentioned compounds represented by the following general formulae (II) through (IV):

and

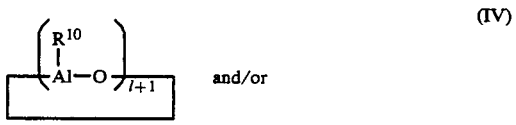

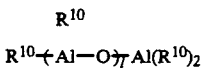

In formulae (II) through (IV), $R^3$, $R^4$, and $R^5$, which may be the same or different, represent a hydrocarbon group having 1 to 12 carbon atoms, a halogen atom or a hydrogen atom, with the proviso that at least one of $R^3$, $R^4$ and $R^5$ represents a hydrocarbon group. $R^6$, $R^7$, $R^8$, and $R^9$, which may be the same or different, represent a hydrocarbon group having 1 to 12 carbon atoms, $R^{10}$ represents a hydrocarbon group having 1 to 12 carbon atoms, and l is an integer of at least 1.

As typical examples of the organic aluminum compound represented by formula (II), there can be mentioned trialkylaluminum compounds such as triethylaluminum, tripropylaluminum, tributylaluminum, trihexylaluminum and trioctylaluminum, alkylaluminum hydrides such as diethylaluminum hydride and diisobutylaluminum hydride, and alkylaluminum halides such as diethylaluminum chloride, diethylaluminum bromide, and ethylaluminum sesquichloride.

As typical examples of the organic aluminum compound represented by formula (III), there can be mentioned alkyldialumoxanes such as tetraethyldialumoxane and tetrabutyldialumoxane.

Formula (IV) represents an aluminoxane, which is a polymer of an aluminum compound. $R^{10}$ includes methyl, ethyl, propyl, butyl, and pentyl groups, but methyl and ethyl groups are preferable. Preferably, l is from 1 to 10.

Among these organic aluminum compounds, trialkylaluminum compounds, alkylaluminum hydrides, and alkylalmoxanes are preferably used, and trialkylaluminum compounds are especially preferably used because they give especially good results.

In the polymerization reaction of α-olefins having at least 3 carbon atoms, to improve the stereoregularity of formed polymers, various compounds having a stereoregularity-improving effect, use of which has been proposed for Ziegler catalysts, can be added to a catalyst system comprising the titanium-containing solid catalyst component of the present invention and a catalyst component comprising an organic aluminum compound. As the compound used for this purpose, there can be mentioned aromatic monocarboxylic acid esters, silicon compounds having an Si—O—C or Si—N—C bond, L acetal compounds, germanium compounds having a Ge—O—C bond, and nitrogen- or oxygen-containing heterocyclic compounds having an alkyl substituent.

As specific examples, there can be mentioned ethyl benzoate, butyl benzoate, ethyl p-toluylate, ethyl p-anisate, phenyltrimethoxysilane, phenyltriethoxysilane, diphenyldimethoxysilane, diphenyldiethoxysilane, di-n-propyldimethoxysilane, cyclohexylmethyldimethoxysilane, tetraethoxysilane, t-butylmethyldimethoxysilane, benzophenonedimethoxyacetal, benzophenonediethoxyacetal, acetophenonedimethoxyacetal, t-butylmethylketonedimethoxy-acetal, diphenyldimethoxygerman, phenyltriethoxygerman, 2,2,6,6-tetramethylpiperidine, and 2,2,6,6-tetramethylpyrane. Among these compounds, silicon compounds having an Si—O—C or Si—N—C bond and acetal compounds are preferably used, and silicon compounds having an Si—O—C bond are especially preferably used.

In the polymerization of olefins, the amount of the organic aluminum compound in the polymerization system is generally at least $10^{-4}$ millimole/l and preferably at least $10^{-2}$ millimole/l. The molar ratio of the organic aluminum compound to the titanium atom in the solid catalyst component is generally at least 0.5, preferably at least 2 and more preferably at least 10. If the amount of the organic aluminum compound is too small, the polymerization activity is drastically reduced. If the amount of the organic aluminum compound used is larger than 20 millimoles/l and the molar ratio to the titanium atom is higher than 1,000, the catalyst performances are not further increased even by further increasing these values.

When the titanium-containing solid catalyst component of the present invention is used, even if the amount of the above-mentioned stereoregularity-improving agent used for improving the stereoregularity of an α-olefin polymer is very small, the intended object can be attained. This agent is generally used, however, in an amount such that the molar ratio to the organic aluminum compound is 0.001 to 5, preferably 0.01 to 1.

In general, olefins having up to 18 carbon atoms are used. As typical instances, there can be mentioned ethylene, propylene, butene-1, 4-methylpentene-1, hexene-1, and octene-1. These olefins can be homopolymerized, or two or more of these olefins can be copolymerized. A typical example is copolymerization of ethylene with propylene.

In carrying out the polymerization, the solid catalyst component of the present invention, the organic aluminum compound and optionally, the stereoregularity-improving agent can be independently introduced into a polymerization vessel, or two or more of them can be premixed.

The polymerization can be carried out in an inert solvent, a liquid olefin monomer or a gas phase. To obtain a polymer having a practically adoptable melt flow rate, a molecular weight modifier (ordinarily, hydrogen) can be made present in the polymerization system.

polymerization temperature is preferably $-10°$ to 180° C. and more preferably 20° to 130° C.

The shape of the polymerization vessel, the polymerization controlling procedure and the post-treatment procedure are not particularly limited in the present invention, and known procedures can be adopted.

The present invention will now be described in detail with reference to the following examples that by no means limit the scope of the invention.

In the examples and comparative examples, the heptane index (H.R.) means the amount (%) of the residue obtained when the obtained polymer was extracted with boiling n-heptane for 6-hours. The melt flow rate (MFR) was measured with respect to the polymer powder containing 0.2% of 2,6-di-tert-butyl-4-methylphenol incorporated therein at a temperature of 230° C. under a load of 2.16 kg according to JIS K-6758.

In the examples, all of the compounds (organic solvents, olefins, hydrogen titanium compounds, magnesium compounds, stereoregularity-improving agents) used for the preparation of the solid catalyst component and the polymerization were in the substantially anhydrous state.

The preparation of the solid catalyst component and the polymerization were carried out in a substantially anhydrous nitrogen atmosphere.

EXAMPLE 1

Preparation of Solid Catalyst Component

A stainless steel cylindrical vessel having an inner volume of 1 liter, in which magnetic balls having a diameter of 10 mm were filled in an amount of about 50% based on the apparent volume, was charged with 20 g (0.21 mole) of anhydrous magnesium chloride (obtained by heating to dry commercially available anhydrous magnesium chloride at about 500° C. for 15 hours in a dry hydrogen chloride gas), 12.7 g (0.05 mole) of ethyl 2-benzoylbenzoate, 3.3 ml of titanium tetrachloride and 3.0 ml of a silicone oil (TSS-451.20CS supplied by Shin-Etsu Chemical) as the pulverizing assistant in a dry nitrogen current. The vessel was attached to a shaking ball mill having an amplitude of 6 mm and the co-pulverization was carried out for 15 hours to obtain a co-pulverized solid. Then, 15 g of the co-pulverized solid was suspended in 150 ml of 1,2-dichloroethane, and the suspension was stirred at 80° C. for 2 hours. The solid was recovered by filtration and thoroughly washed with hexane until free 1,2-dichloroethane was not detected in the washing liquid. The solid was dried at a low temperature to 30° to 40° C. under a reduced pressure to remove hexane, whereby a solid catalyst component was obtained. The titanium atom content in the solid catalyst component was 2.3% by weight.

Polymerization and Physical Properties of Polymer

A stainless steel autoclave having an inner volume of 3 l was charged with 20 mg of the solid catalyst component prepared by the above-mentioned method, 91 mg of triethylaluminum and 20 mg of diphenyldimethoxysilane, and immediately, 760 g of propylene and 0.1 g of hydrogen were charged into the autoclave. The inner temperature of the autoclave was elevated and maintained at 70° C. After 1 hour, the gas in the autoclave was discharged to stop the polymerization. As the result, 210 g of powdery polypropylene was obtained. The polymerization activity was thus 10,900 g/g of solid catalyst component.hour and 474 kg/g of Ti.hour. The H.R. of the powdery polypropylene was 95.1%, and the MRF was 5.2 g/10 min.

EXAMPLE 2

Using the solid catalyst component prepared in Example 1, the polymerization was carried out in the same manner as described in Example 1 except that the polymerization temperature was changed to 80° C. As the result, 253 g of a powdery polymer was obtained. The polymerization activity was 12,700 g/g of solid catalyst component.hr and 550 kg/g of Ti.hour, the H.R. of the powdery polypropylene was 96.0%, and the MFR was 4.7 g/10 min.

EXAMPLE 3

Using the solid catalyst component used in Example 1, the polymerization was carried out in the same manner as described in Example 1 except that 20 mg of phenyltriethoxysilane was used at the polymerization instead of diphenyldimethoxysilane. The polymerization activity was 11,300 g/g of solid catalyst component.hr and 4.91 kg/g of Ti.hr, the H.R. of the obtained polymer was 94.9%, and the MFR was 11.7 g/10 min.

EXAMPLES 4 THROUGH 7

Using the solid catalyst component used in Example 1, the polymerization was carried out in the same manner as described in Example 1 except that the stereoregularity-improving agent added was changed as shown in Table 1. The results are shown in Table 1.

TABLE 1

| Example No. | Stereoregularity-improving agent | Amount added (molar ratio to Al) | Polymerization activity (g/g · cat* · hr) | H.R. (%) | MFR (g/10 min) |
|---|---|---|---|---|---|
| 4 | Phenyltriethoxysilane | 0.3 | 10,200 | 95.6 | 6.7 |
| 5 | t-Butylmethyldimethylacetal | 0.3 | 6,900 | 93.7 | 4.1 |
| 6 | Benzophenonedimethylacetal | 0.3 | 7,100 | 94.1 | 1.8 |
| 7 | 2,2,6,6-Tetramethylpiperidine | 0.15 | 15,400 | 95.0 | 2.6 |

*solid catalyst component

EXAMPLE 8

In a round-bottom flask, 9.5 g of anhydrous magnesium chloride (treated in the same manner as described in Example 1) was heated and dissolved at 130° C. for 2 hours in 50 ml of decane and 46.8 ml of 2-ethylhexyl alcohol in an $N_2$ atmosphere. Then, 2.1 g of phthalic anhydride was added to the mixture, and the mixture was heated at 130° C. for 1 hour. The liquid mixture was cooled to room temperature and 20 ml of the liquid mixture was charged in a dropping funnel and dropped into 80 ml of titanium tetrachloride maintained at −20° C. over a period of 30 minutes. The temperature was elevated to 110° C. over a period of 4 hours, and a solution of 3.81 g of ethyl 2-benzoylbenzoate was gradually dropped into the reaction mixture. After termination of the dropwise addition, the reaction was carried out at 110° C. for 2 hours. The supernatant was removed, 80 ml of $TiCl_4$ was added to the residue, and the mixture was heated at 110° C. for 2 hours. Then, the formed solid was washed with 100 ml of n-decane three times and then with n-hexane to obtain a solid catalyst component in which the amount of Ti supported was 2.3% by weight.

Using the thus-obtained solid catalyst component, the polymerization was carried out in the same manner as described in Example 1. The polymerization activity was 13,700 g/g of solid catalyst.hr and 596 kg/g of Ti.hr, the H.R. was 96.4%, and the MFR was 7.1 g/10 min.

EXAMPLE 9

A round-bottom flask having a capacity of 300 ml, which was sufficiently dried in a nitrogen current, was charged with 100 ml of n-heptane, 9.5 g of $MgCl_2$ and 68 g of Ti(O-Bu) and the reaction was carried out at 100° C. for 2 hours to form a homogeneous solution. After termination of the reaction, the temperature was lowered to 40° C. and 15 ml of methylhydrogen polysiloxane (20 cSt) was added to the solution, and the reaction was carried out for 3 hours. The formed solid catalyst was washed with n-heptane 150 ml of heptane was added to the solid catalyst, and a solution of 28 g of $SiCl_4$ in 80 ml of n-heptane was dropped at room temperature over a period of 1 hour. After termination of the dropwise addition, the reaction was further conducted for 30 minutes. The obtained solid component was washed with 200 ml of n-heptane three times and cooled to −10° C. Then, 100 ml of $TiCl_4$ was introduced into the solid, the resulting mixture was thoroughly stirred, and 3.23 g of ethyl 2-benzoylbenzoate was added dropwise to the mixture. After termination of the dropwise addition, the reaction was carried out at 90° C. for 2 hours. The supernatant was removed, 100 ml of $TiCl_4$ was introduced, and the reaction was carried out at 90° C. for 2 hours. After the reaction, the formed solid was washed with n-heptane to obtain a solid catalyst. From the results of the analysis, it was found that the amount of Ti supported was 1.7% by weight.

Using the thus-obtained solid catalyst component, the polymerization was carried out in the same manner as described in Example 1. The polymerization activity was 8,630 g/g of solid catalyst.hr and 454 kg/g of Ti.hr, the H.R. was 94.0%, and the MFR was 17.2 g/10 min.

EXAMPLE 10

A round-bottom flask having a capacity of 300 ml, which was sufficiently dried in a nitrogen current, was charged with 5 g of magnesium diethoxide, 1.40 g of ethyl 2-benzoylbenzoate and 25 ml of methylene chloride, and the mixture was stirred under reflux for 1 hour. The formed suspension was introduced under pressure into 200 ml of $TiCl_4$ maintained at room temperature, the temperature of the mixture was gradually elevated to 110° C., and the reaction was carried out with stirring for 2 hours. After termination of the reaction, the precipitated solid was recovered by filtration and washed with 200 ml of n-decane maintained at 110° C. three times. Then, 200 ml of TiCl₄ was added to the solid and the reaction was carried out at 120° C. for 2 hours. After termination of the reaction, the precipitated solid was recovered by filtration, washed with 200 ml of n-decane maintained at 110° C. three times and then washed with hexane until the chlorine ion was not detected. The content of the titanium atom in the obtained catalyst component was 3.3%.

Using the thus-obtained solid catalyst component, the polymerization was carried out in the same manner as described in Example 1. It was found that the polymerization activity was 20,400 g/g of solid catalyst component.hr and 618 kg/g of Ti.hr, the H.R. was 96.1%, and the MFR was 10.7 g/10 min.

EXAMPLES 11 THROUGH 21

Solid catalyst components were prepared in the same manner as described in Example 10 except that ester compounds shown in Table 2 were used instead of ethyl 2-benzoylbenzoate. Using the thus-prepared solid catalyst components, the polymerization was carried out in the same manner as described in Example 1. The results are shown in Table 2.

TABLE 2

| Example No. | Keto-esters of formula (I) | Polymerization activity (g/g · cat* · hr) | (%) | (g/10 min) |
|---|---|---|---|---|
| 11 | Ethyl 2-(4'-methylbenzoyl)benzoate | 19,300 | 96.4 | 7.0 |
| 12 | Ethyl 2-(2',4'-dimethylbenzoyl)benzoate | 22,100 | 96.3 | 15.9 |
| 13 | Ethyl 2-benzoyl-4,5-dimethylbenzoate | 20,900 | 96.0 | 5.4 |
| 14 | n-Propyl 2-benzoyl-3,6-dimethylbenzoate | 17,300 | 96.3 | 2.3 |
| 15 | Ethyl 2-(2',4',6'-trimethylbenzoyl)benzoate | 22,700 | 96.9 | 11.0 |
| 16 | Ethyl 2-(4'-chlorobenzoyl)benzoate | 21,200 | 95.1 | 7.3 |

*solid catalyst component

COMPARATIVE EXAMPLE 1

A solid catalyst component was prepared in the same manner as described in Example 10 except that ethyl benzoate was used instead of ethyl 2-benzoylbenzoate used in Example 10. Using the obtained solid catalyst component, the polymerization was carried out in the same manner as described in Example 1. It was found that the polymerization activity was 15,300 g/g of solid catalyst component.hr and 655 kg/g of Ti.hr, the H.R. of the obtained polypropylene powder was 80.1%, and the MFR was 3.2 g/10 min.

When olefins are polymerized by using the catalyst component obtained according to the present invention, since the catalyst has a very high activity, the content of the catalyst residue in the formed polymer can be reduced to a very low level, and therefore, the ash-removing step can be omitted. Furthermore, since the amount (concentration) of the residual halogen is small, the degree of corrosion of a molding machine or the like at the polymer-processing step can be greatly lowered. The residual catalyst causes deterioration and yellowing of the polymer. According to the present invention, the concentration of the residual catalyst is very low, and thus the occurrence of these undesirable phenomena can be controlled.

Moreover, since the obtained polymer has a high stereoregularity, a polymer having a practically sufficient mechanical strength can be obtained without removing an atactic portion.

What is claimed is:

1. A process for preparing stereoregular olefin polymers which comprises contacting an olefin having 2 to 18 carbon atoms with a catalyst composition for use in the polymerization of olefins, which comprises (a) a catalyst component containing magnesium, titanium, and a halogen, (b) an organoaluminum compound, and (c) 0.001 to 5 moles, per mole of the organoaluminum compound (b), of a stereoregularity-improving agent selected from the group consisting of aromatic monocarboxylic acid esters, silicon compounds having an Si—O—C or Si—N—C bond, acetal compounds, germanium compounds having a Ge—O—C bond, and nitrogen-or oxygen-containing heterocyclic compounds having an alkyl substituent;

said catalyst component further containing an ingredient which is at least one member selected from the group consisting of keto-esters represented by the following formula (I):

wherein R¹ and R² independently represent a univalent hydrocarbon group having 1 to 20 carbon atoms which may have a chloride substituent, and Z represents a divalent aromatic or polycyclic hydrocarbon group having 6 to 20 carbon atoms which may have a chlorine substituent, the R¹ and R² being selected from the group consisting of aliphatic hydrocarbons, alicyclic hydrocarbons, aromatic hydrocarbons, and polycyclic hydrocarbons; and said organoaluminum compound being selected from the group consisting of the compounds represented by the following general formulae (II) through (V):

wherein R³, R⁴ and R⁵ independently represent a hydrocarbon group having 1 to 12 carbon atoms, a halogen atom or a hydrogen atom, with the proviso that at least one of $R^3$, $R^4$ and $R^5$ represents a hydrocarbon group, $R^6$, $R^7$, $R^8$, and $R^9$ independently represent a hydrocarbon group having 1 to 12 carbon atoms, $R^{10}$ represents a hydrocarbon group having 1 to 12 carbon atoms, and l is an integer of at least 2.

2. The polymerization process according to claim 1, wherein, in formula (I), $R^1$ represents a univalent aromatic or polycyclic hydrocarbon group having 6 to 20 carbon atoms, and $R^2$ represents a univalent aliphatic hydrocarbon group having 1 to 12 carbon atoms.

3. The polymerization process according to claim 1, wherein the catalyst component contains titanium, magnesium, and the ingredient which is the keto-ester of formula (I) at a molar ratio of $1/(1-1,000)/10^{-6-100}$, respectively.

4. The polymerization process according to claim 1, wherein the amount of the catalyst composition used is such that the amount of the organoaluminum compound is $10^{-4}$ to 20 millimoles per liter of the polymerization system and 0.5 to 1,000 moles per mole of titanium atom in the catalyst component.

5. The polymerization process according to claim 1, wherein the polymerization is carried out at a temperature of $-10°$ C. to $180°$ C.

* * * * *